Patented Sept. 9, 1952

2,610,192

UNITED STATES PATENT OFFICE 2,610,192

METHOD FOR PRODUCING HYDROXY SULFOLENES

John E. Mahan, Bartlesville, Okla., and Sig C. Fauske, Borger, Tex., assignors to Phillips Petroleum Company, a corporation of Delaware No Drawing. Application October 21, 1949, Serial No. 122,858

12 Claims. (Cl. 260—332.1)

This invention relates to a method for producing hydroxy sulfolenes. In a particular aspect this invention relates to the interaction of ammonia with a 3-halo-4-hydroxy sulfolane to produce the corresponding 4-hydroxy-2-sulfolene as a product of the reaction.

It is an object of this invention to provide a method for producing hydroxy sulfolenes.

It is another object of this invention to provide a method for producing 4-hydroxy-2-sulfolenes by the interaction of ammonia with a 3-halo-4-hydroxy sulfolane.

It is a further object of this invention to provide a method for producing 4-hydroxy-2-sulfolenes by the interaction of a primary or secondary amine with a 3-halo-4-hydroxy sulfolane.

Further and additional objects of our invention will be readily manifest from our disclosure hereinafter.

We have found that when a 3-halo-4-hydroxy sulfolane is reacted with ammonia or a primary or secondary amine at reaction conditions to be specified hereinbelow, a 4-hydroxy-2-sulfolene is a product of the reaction, and we have found further that the percentage yield of 4-hydroxy-2-sulfolene is dependent upon the reaction conditions employed.

The 3-halo-4-hydroxy sulfolanes for our process may be obtained from any suitable source or produced in any known manner. For example, a 1,3-butadiene hydrocarbon and sulfur dioxide may be used as starting materials, the butadiene having as a structural formula

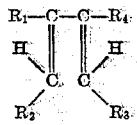

wherein each of $R_1$, $R_2$, $R_3$ and $R_4$ represents hydrogen or an alkyl radical, such as methyl, ethyl, propyl, and the like, and wherein the sum of the carbon atoms contained in the 1,3-butadiene molecule does not exceed ten. Throughout our disclosure, when referring to "a 1,3-butadiene," we refer to any 1,3-butadiene hydrocarbon represented by the above structural formula, and when referring to the specific compound termed "1,3-butadiene," we refer to the hydrocarbon corresponding to the above structural formula wherein each of $R_1$, $R_2$, $R_3$ and $R_4$ represents hydrogen. The sulfur dioxide and the butadiene are reacted using molar ratios of sulfur dioxide to the butadiene within the range of 1:1 to 3:1 and at an elevated temperature and pressure. The temperature may be within the range of 35 to 150° C., preferably 100 to 135° C., and the pressure may be within the range of 75 to 300 p. s. i. Reaction periods of 0.25 to 6, preferably 1 to 3, hours are employed, and such polymerization inhibitors as pyrogallol, tert-butyl catechol, and the like may be used. The resulting product, a 3-sulfolene, conforms to the structural formula

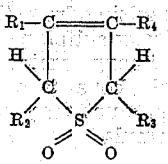

wherein $R_1$, $R_2$, $R_3$ and $R_4$ conform with the definition set forth above. The 3-sulfolene thus produced is then dissolved in water, and gaseous chlorine is introduced with agitation at conditions of temperature and pressure such that the aqueous solution is in the liquid state until absorption of chlorine ceases. Upon completion of the reaction the resulting mixture is cooled, say, to a temperature of 10 to 25° C. to crystallize and thus separate the desired reaction product. While chlorine is preferred for the halogenation of the aqueous solution of the 3-sulfolene, as described above, any halogen selected from the group consisting of chlorine, iodine and bromine may be employed. The principal product, a 3-halo-4-hydroxy sulfolane, resulting from halogenation reaction has the structural formula

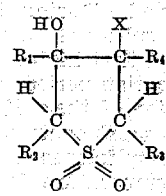

wherein $R_1$, $R_2$, $R_3$ and $R_4$ are as defined above, and wherein X represents a halogen selected from the group consisting of chlorine, iodine and bromine. This product is a 3-halo-4-hydroxy sulfolane, and it is used as a starting material for our novel reaction. The term "a 3-halo-4-hydroxy sulfolane" refers to any compound within the scope of this structural formula, and the term "3-halo-4 hydroxy sulfolane" refers to the specific compound corresponding to this structural formula wherein each of $R_1$, $R_2$, $R_3$ and $R_4$ represents hydrogen.

The other starting material is preferably ammonia, but in lieu of ammonia any primary or secondary amine may be used. The primary or secondary amine should contain no more than twelve carbon atoms per molecule. The structural formula

is representative of the ammonia and amines that may be used in our process. In this structural formula $R^1$ and $R^2$ represent hydrogen or alkyl, aryl, aralkyl, alkaryl and cycloalkyl radicals, and the sum of the carbon atoms in $R^1$ and $R^2$ does not exceed twelve. Typical examples of radicals that $R^1$ and $R^2$ may represent are methyl, ethyl, propyl, butyl, pentyl, phenyl, naphthyl, benzyl, phenyl ethyl, tolyl, xylyl, cyclopentyl and cyclohexyl. Also, $R^1$ and $R^2$ may represent members of a heterocyclic ring of which the nitrogen in the above structural formula is also a member. Typical examples of the heterocyclic compounds represented by the above structural formula are piperidine and its homologs and morpholine and its homologs. The above typical examples of $R^1$ and $R^2$ radicals and of the compounds represented by the structural formula are merely illustrative, but not exhaustive, of the radicals and compounds that may be used in our process.

The product resulting from the interaction of the 3-halo-4-hydroxy sulfolane with at least one of ammonia, primary amine and secondary amine, as defined above, is a 4-hydroxy-2-sulfolene, and the product may be represented by the structural formula

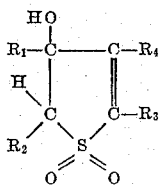

wherein $R_1$, $R_2$, $R_3$ and $R_4$ conform with the definition set forth above. The term "a 4-hydroxy-2-sulfolene" refers to any compound within the scope of this structural formula, and the term "4-hydroxy-2-sufolene" refers to the specific compound wherein $R_1$, $R_2$, $R_3$, $R_4$ in the structural formula each represents hydrogen.

The yield of 4-hydroxy-2-sulfolenes obtained from our process is dependent upon the reaction conditions employed. During the reaction 3-amino-4-hydroxy sulfolanes are also produced, and we have found that high reaction temperatures and long reaction periods or contact times favor the production of the sulfolanes while low temperatures and short contact times favor the production of the sulfolenes.

The reaction temperature for our process is within the range of —50 to 200° C., and the contact time is within the range of one second to 72 hours. To produce 4-hydroxy-2-sulfolenes we prefer to operate with a contact time not above 24 hours and with a temperature within the range of —35 to 100° C. As the reaction temperature and contact time approach the maximum limits of our specified ranges the yield of amino-hydroxy sulfolane increases with a consequent decrease in the yield of hydroxy sulfolene. This fact will be shown in greater detail in our specific examples hereinbelow.

The reaction pressure employed is usually the autogenetic pressure of the reactants, but higher pressures may be employed. Pressures sufficient to maintain the reactants in a liquid state are preferred, and such pressures fall within the range of atmospheric to 1500 p. s. i.

The molar ratio of ammonia, primary or secondary amine to the 3-halo-4-hydroxy sulfolane is at least 2:1, preferably above 3:1. The upper limit of this ratio is not critical, and ratios as high as 500:1 and higher may be used. During the reaction minor amounts of reaction by-products resulting from the interaction of one or two molecules of the halo-hydroxy sulfolane with the amino-hydroxy sulfolane are produced, particularly when operating with relatively small amounts of ammonia or amine. In order to prevent the formation of excessive quantities of the by-products the molar ratio of reactants should be at least 2:1.

The above description of our process has been limited essentially to a method for producing hydroxy sulfolenes, but it is quite obvious that our process can also be employed to produce amino-hydroxy sulfolanes, more particularly 3-amino-4-hydroxy sulfolanes, having the general formula

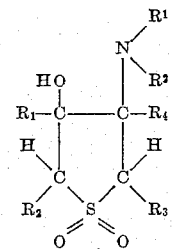

wherein $R_1$, $R_2$, $R_3$, $R_4$, $R^1$ and $R^2$ correspond to the definitions set forth above. Thus, it is a further object of our invention to produce 3-amino-4-hydroxy sulfolenes and to provide a method for producing same.

In order to produce hydroxy sulfolenes a temperature and contact time below that at which an amino-hydroxy sulfolane is the sole reaction product are employed. On the other hand, to produce amino-hydroxy sulfolanes a temperature and contact time above that at which an hydroxy sulfolene is the sole reaction product are employed. Generally, to produce either of the reaction products a temperature within the broad range of —50 to 200° C. and a contact time of one second to 72 hours are employed. However, to produce substantial yields of amino-hydroxy sulfolanes it is preferred that a reaction temperature within the range of 30 to 150° C. and a contact time of at least one hour be employed. At the reaction conditions we have disclosed the reaction effluent contains hydroxy sulfolenes and aminohydroxy sulfolanes, and the percentage composition of each in the reaction effluent is dependent upon the reaction conditions employed.

The amino-hydroxy sulfolanes that are produced in accordance with our invention are soluble in water and acetone and slightly soluble in acetonitrile, and these solvents may be employed to isolate the sulfolanes from other reaction products. Water has the disadvantage of causing a portion of the amino-hydroxy sulfolanes to hydrolyze, presumably to dihydroxysulfolane. The compound, 3-amino-4-hydroxy sulfolane, that we prepared is a white, crystalline solid and it was found to have a molecular weight of 151.18 and a melting point of 192–193° C.

Although our process may be effected in the absence of solvents, the reaction may be carried out in the presence of inert, normally liquid, organic solvents such as low molecular weight alcohols and ethers. Typical examples of the solvents that may be employed are ethyl alcohol and diethyl ether and their low-molecular weight homologs.

The following examples are illustrative of our invention.

Example I 3-chloro-4-hydroxy sulfolane (100 grams) was dissolved in 400 milliliters of liquid ammonia at −33° C. and atmospheric pressure. After complete solution of the sulfolane the ammonia was boiled off as quickly as possible. This entire operation was carried out in about 10 minutes. The reaction product was extracted with acetone to remove the crude 4-hydroxy-2-sulfolene from the ammonium chloride formed in the reaction. The acetone soluble products were separated from the insoluble ammonium chloride, and the acetone was stripped from the crude product. Analysis showed that the product contained a negligible amount of chlorine and nitrogen. Determination of the hydroxyl number on a sample of the crude product showed that it contained 74 grams of 4-hydroxy-2-sulfolene. This represents a yield of 94.3 per cent of theory.

Further proof of the structure was effected by redistillation of the crude product to obtain a material which boiled at 156° C. at about 0.2 mm. Hg. It was analyzed for weight per cent carbon, hydrogen, and sulfur.

|   | Found | Calculated |
|---|---|---|
| C | 36.54 | 35.8 |
| H | 4.53 | 4.5 |
| S | 23.0 | 23.8 |

The product decolorized neutral potassium permanganate. The acetate derivative of 4-hydroxy-2-sulfolene was made, and its melting point of 114° C. was found to be in close agreement with the melting point of 112–113° C. reported for this compound in the literature. The product was found to be soluble in water, ethyl alcohol and acetone.

Example II

A run was made wherein 28 grams of 3-chloro-4-hydroxy sulfolane was dissolved in 707 grams of liquid ammonia at atmospheric pressure and a temperature of −33° C. and allowed to stand for 48 hours. At the end of this period excess ammonia was evaporated from the reaction products. The products were separated from the by-product ammonium chloride by extraction with acetonitrile. Analysis showed that the products comprised 2.8 grams of 4-hydroxy-2-sulfolene, or a yield of 12.7 per cent of theory, and 20.0 grams of 3-amino-4-hydroxy sulfolane, or a yield of 82.1 per cent of theory.

Example III

Another run was effected in substantially the same manner as in Example I at the same temperature, but employing a contact time of 15 minutes instead of 10 minutes. The yield in this case was 92.4 per cent of theory of 4-hydroxy-2-sulfolene and 0.7 per cent of theory of 3-amino-4-hydroxy sulfolane.

Example IV

Two further reactions between liquid ammonia and 3-chloro-4-hydroxy sulfolane were carried out in an autoclave. The observed data are tabulated as follows:

| Run No. | Mol Ratio, Ammonia to 3-Chloro-4-Hydroxy Sulfolane | Reaction Time, Hours | Temperature, °C. | Mol Percent Yield of 3-Amino-4-Hydroxy Sulfolane | Mol Percent Yield of 4-Hydroxy-2-Sulfolene |
|---|---|---|---|---|---|
| 1 | 128.5 | 2 | 100 | 70.9 | 27.4 |
| 2 | 130.2 | 2 | 35 | 58.0 | 41.0 |

From our disclosure hereinabove, modifications of our process within the scope of our invention will be apparent to those skilled in the art.

We claim:

1. The process which comprises interacting a halo-hydroxy sulfolane with a compound selected from the group consisting of ammonia, primary amines and secondary amines and recovering at least one of an hydroxy sulfolene and an amino-hydroxy sulfolane as a product of the reaction.

2. The process for producing an hydroxy sulfolene which comprises interacting a halo-hydroxy sulfolane with a compound selected from the group consisting of ammonia, primary amines and secondary amines at a temperature and a contact time below that at which an amino-hydroxy sulfolane is the sole organic product of the reaction.

3. The process for producing a 4-hydroxy-2-sulfolene which comprises interacting a 3-halo-4-hydroxy sulfolane with a compound selected from the group consisting of ammonia, primary amines and secondary amines at a temperature and a contact time below that at which a 3-amino-4-hydroxy sulfolane is the sole organic product of the reaction.

4. The process which comprises reacting a 3-halo-4-hydroxy sulfolane having the structural formula

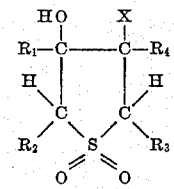

wherein $R_1$, $R_2$, $R_3$ and $R_4$ each is selected from the group consisting of hydrogen and alkyl radicals, wherein the total number of carbon atoms in the molecule does not exceed ten and wherein X represents a halogen selected from the group consisting of chlorine, bromine and iodine, with a compound selected from the group consisting of ammonia, primary amines and secondary amines at a temperature not above 200° C. and at a contact time not over 72 hours, and recovering a 4-hydroxy-2-sulfolene corresponding to said 3-halo-4-hydroxy sulfolane as a product of the reaction.

5. A process according to claim 4 wherein the reaction is effected in liquid phase.

6. A process according to claim 4 wherein a temperature within the range of −50 to 200° C. is employed.

7. A process according to claim 4 wherein a contact time within the range of 1 second to 72 hours is employed.

8. A process according to claim 4 wherein the molar ratio of the compound selected from the group consisting of ammonia, primary amines and secondary amines to sulfolane is at least 2:1.

9. A process according to claim 4 wherein the reaction is effected in the presence of an inert, liquid, organic solvent.

10. The process which comprises reacting 3-chloro-4-hydroxy sulfolane with ammonia at a temperature within the range of −35 to 100° C. for a period of time not in excess of 24 hours at a pressure sufficient to maintain a liquid phase reaction and employing a molar ratio of ammonia to sulfolane of at least 3:1, and recovering 4-hydroxy-2-sulfolene as a product of the reaction.

11. The process for producing a 3-amino-4-hydroxy sulfolane which comprises interacting a 3-halo-4-hydroxy sulfolane with a compound selected from the group consisting of ammonia, primary amines and secondary amines at a temperature and a contact time above that at which a 4-hydroxy sulfolene is the sole organic product of the reaction.

12. A process according to claim 11 wherein the temperature is within the range of 30 to 150° C. and wherein the contact time is at least one hour.

JOHN E. MAHAN.
SIG C. FAUSKE.

REFERENCES CITED

The following references are of record in the file of this patent:

UNITED STATES PATENTS

| Number | Name | Date |
|---|---|---|
| 2,430,821 | Morris | Nov. 11, 1947 |
| 2,435,071 | Evans | Jan. 27, 1948 |
| 2,465,912 | Morris | Mar. 29, 1949 |

OTHER REFERENCES

Weygand: "Organic Preparations", pp. 207–208, 316, Interscience Publishers, N. Y., 1945.

Whitmore: "Organic Chemistry", pp. 75–76, Van Nostrand, N. Y., 1937.